(12) United States Patent
Hasty

(10) Patent No.: US 8,556,669 B2
(45) Date of Patent: Oct. 15, 2013

(54) CAM LOCK

(76) Inventor: David C. Hasty, Toledo, OH (US)

( * ) Notice: Subject to any disclaimer, the term of this patent is extended or adjusted under 35 U.S.C. 154(b) by 118 days.

(21) Appl. No.: 13/345,933

(22) Filed: Jan. 9, 2012

(65) Prior Publication Data
US 2013/0178118 A1  Jul. 11, 2013

(51) Int. Cl.
*B63H 20/08* (2006.01)
(52) U.S. Cl.
USPC ............................................. 440/55; 403/33
(58) Field of Classification Search
USPC .......... 114/144 R, 150; 440/6, 53, 55; 403/33
See application file for complete search history.

(56) References Cited

U.S. PATENT DOCUMENTS

| | | | | |
|---|---|---|---|---|
| 3,861,348 A | * | 1/1975 | Beierle | 440/6 |
| 4,916,969 A | * | 4/1990 | Henning | 114/144 R |
| 5,591,109 A | * | 1/1997 | Strnad | 482/107 |

\* cited by examiner

*Primary Examiner* — Lars A Olson
(74) *Attorney, Agent, or Firm* — Shumaker, Loop & Kendrick, LLP

(57) ABSTRACT

A cam lock that includes a cam body having a lobe-shaped working periphery and rotatable between a first locking position and a second unlocked position, a handle shaft mounted to the cam body for moving the cam body through a predetermined range of motion, and a cam shaft mounted to the cam body for pivotal movement relative to the cam body and having an end remote from the cam body for being fixed to a structure to be locked by a force applied against the structure. A bushing is mounted on the cam shaft and has an end proximate the cam body against which a locking force is applied when the cam body is rotated into its locking position.

10 Claims, 3 Drawing Sheets

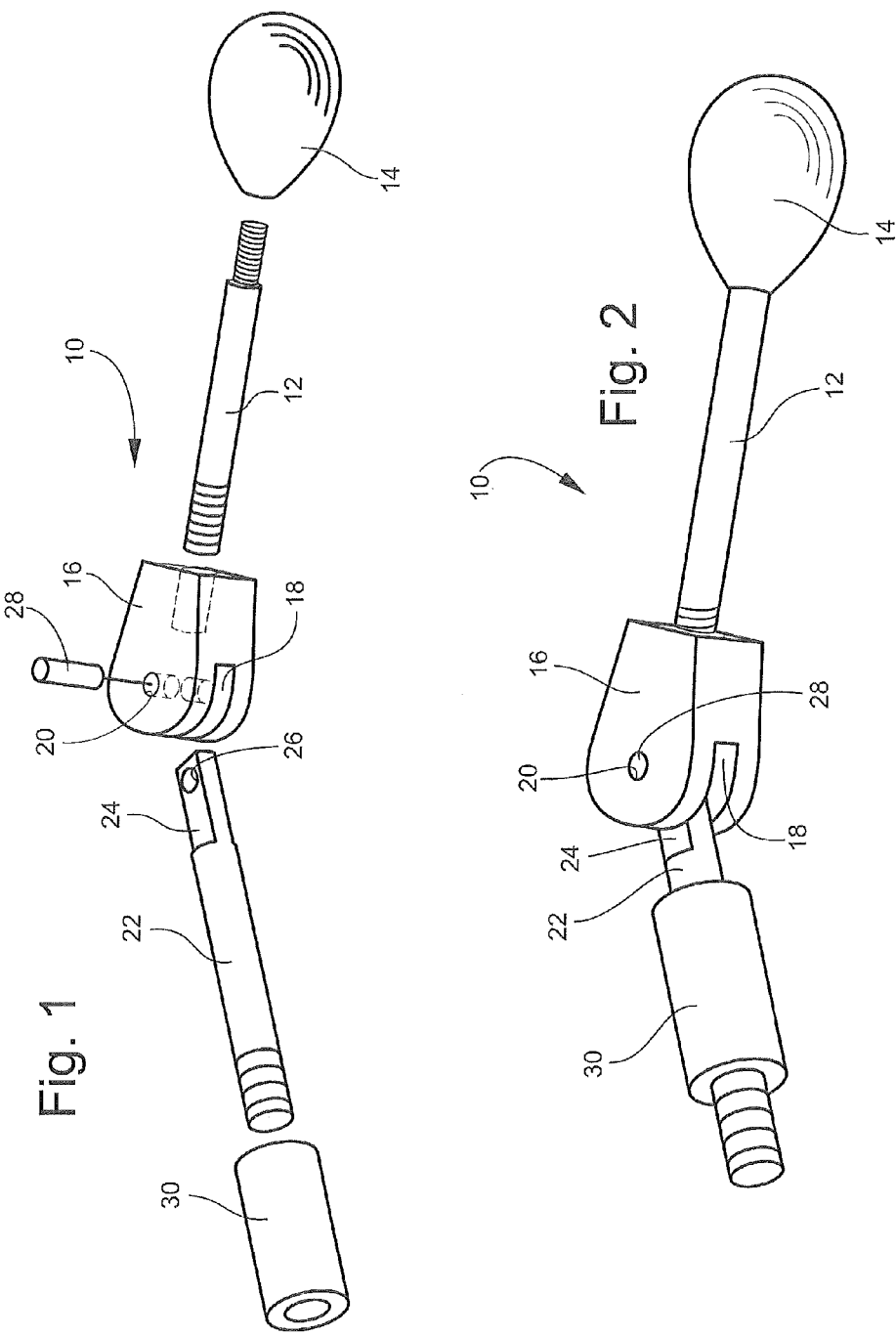

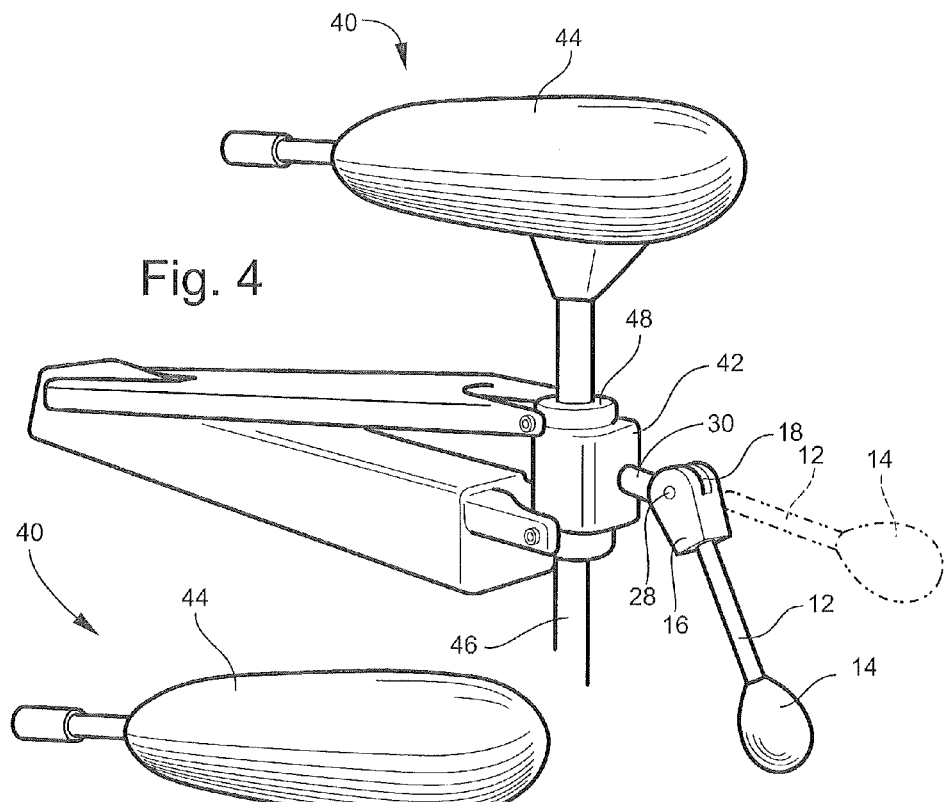
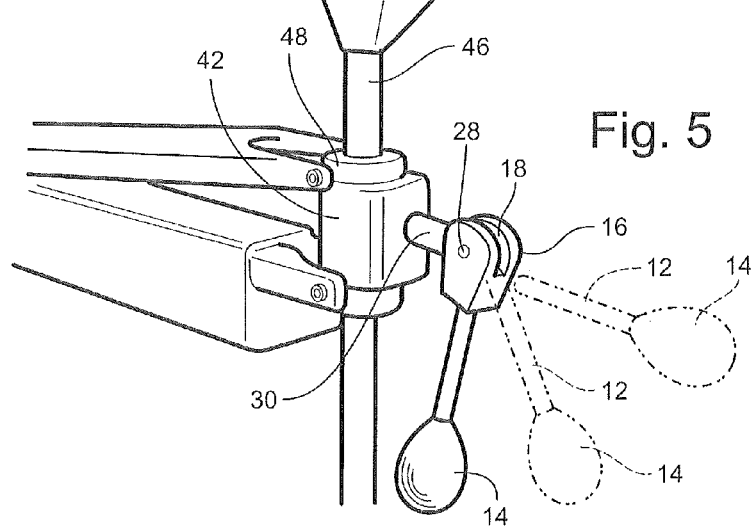

CAM LOCK

TECHNICAL FIELD AND BACKGROUND OF THE INVENTION

The present invention relates to a cam lock, particularly adapted for quick operation with a single hand. Numerous adjustable devices require locking mechanisms that are infinitely adjustable within a given range. Post-mounted bicycle seats are but one example. Another example is a sliding adjustment mechanism for varying the height of a trolling motor. Such motors generally include a mounting bracket in which is mounted for sliding adjustment an elongate propeller drive shaft that interconnects the motor, whether electric or internal combustion, and the propeller. The motor is mounted to a boat gunwale with the propeller drive shaft extending downwardly alongside the hull into the water to a desired depth. Present mechanisms for adjusting the depth of the propeller require unscrewing one or more adjustment bolts, raising or lowering the propeller drive shaft in the mounting bracket, and then retightening the bolts. This procedure requires two hands and in some instances a tool. This is a time-consuming requirement that ordinarily would require bringing a boat that is underway to a halt.

Therefore, it is an object of the invention to provide a cam lock that is rapidly operable with one hand to release, adjust and then relock a shaft or similar elongate member with relation to a mounting member in which the elongate member is positioned. While the particular embodiment of the invention is described in this application with reference to a cam lock for a trolling motor, the invention is not so limited but is considered to be generally applicable to uses reasonably suggested by the functionality of the device.

SUMMARY OF THE INVENTION

It is an object of the present invention to provide a cam lock that is easily and quickly operable.

It is a further object of the invention to provide a cam lock that can be operated manually with a single hand.

It is a further object of the invention to provide a trolling motor that has a propeller drive shaft that is vertically adjustable by means of a cam lock according to the invention in order to vary the depth of the trolling motor propeller.

These and other objects and advantages of the invention are achieved by providing a cam lock that includes a cam body having a lobe-shaped working periphery and rotatable between a first locking position and a second unlocked position, a handle shaft mounted to the cam body for moving the cam body through a predetermined range of motion, and a cam shaft mounted to the cam body for pivotal movement relative to the cam body and having an end remote from the cam body for being fixed to a structure to be locked by a force applied against the structure. A bushing is mounted on the cam shaft and has an end proximate the cam body against which a locking force is applied when the cam body is rotated into its locking position.

According to one embodiment of the invention, the cam shaft has a range of motion of approximately 110 degrees relative to the cam body.

According to another embodiment of the invention, the cam body includes a slot, and a perpendicular bore is formed through the cam body in a position to intersect the slot. The cam shaft is positioned in the slot and fixed into a rotatable position by a dowel pin that extends through the bore in the cam body.

According to another embodiment of the invention, a cam lock for is provided for locking an elongate member in a predetermined desired position along a length of the elongate member, and comprises a cam body having a lobe-shaped working periphery and rotatable between a first locking position and a second unlocked position and a handle shaft mounted to the cam body for moving the cam body through a predetermined range of motion. A cam shaft is mounted to the cam body for pivotal movement relative to the cam body and has an end remote from the cam body operatively associated with a collar in which the elongate member is positioned for movement therein along the longitudinal axis of the elongate member. A bushing is mounted on the cam shaft and has an end proximate the cam body against which a locking force is applied when the cam body is rotated into its locking position. The bushing has an end distal from the cam body adapted to exert a locking force against the collar when the cam body is in its locking position to fix the elongate member in the desired position.

According to another embodiment of the invention a slot formed in the cam body, a perpendicular bore is formed through the cam body in a position to intersect the slot, and the cam shaft is positioned in the slot and fixed into a rotatable position by a dowel pin that extends through the bore in the cam body.

According to another embodiment of the invention a trolling motor assembly is provided that includes a motor positioned in a motor housing and a propeller drive shaft interconnecting the motor and a propeller. A locking block having a bore within which the propeller drive shaft is mounted for vertical movement of the propeller to a predetermined desired water depth. A cam lock for locking the propeller drive shaft in the predetermined desired position includes a cam body having a lobe-shaped working periphery rotatable between a first locking position and a second unlocked position. A handle shaft is mounted to the cam body for moving the cam body through a predetermined range of motion. A cam shaft is mounted to the cam body for pivotal movement relative to the cam body and has an end remote from the cam body that is operatively associated with a collar in which the propeller drive shaft is positioned for movement therein along the longitudinal axis of the propeller drive shaft. A bushing is mounted on the cam shaft and has an end proximate the cam body against which a locking force is applied when the cam body is rotated into its locking position. The bushing has an end distal from the cam body that is adapted to exert a locking force against the collar when the cam body is in its locking position to fix the propeller drive shaft in the desired position.

According to another embodiment of the invention a slot is formed in the cam body, and a perpendicular bore is formed through the cam body in a position to intersect the slot. A cam shaft is positioned in the slot and fixed into a rotatable position by a dowel pin that extends through the bore in the cam body.

According to another embodiment of the invention the handle shaft includes a knob on a distal end thereof.

According to another embodiment of the invention, the bushing has a cylindrical body having a bore through which the cam shaft extends. The bushing may be a polycarbonate material.

According to another embodiment of the invention, the cam shaft includes a flat positioned in the slot of the cam body for rotation therein.

BRIEF DESCRIPTION OF THE DRAWING FIGURES

The present invention is best understood when the following detailed description of the invention is read with reference to the accompanying drawings, in which:

FIG. 1 is an exploded perspective view of a cam lock according to one embodiment of the invention;

FIG. 2 is an assembly perspective view of the cam lock FIG. 1;

FIG. 4 is a perspective view of the trolling motor according to FIG. 3 showing the intermediate position of the lock during an operation to move the propeller drive shaft; and FIG. 5 is a perspective view of the trolling motor according to FIG. 3 showing movement of the cam lock from the release position to the lock position.

DETAILED DESCRIPTION OF THE PREFERRED EMBODIMENT

Figure 3:
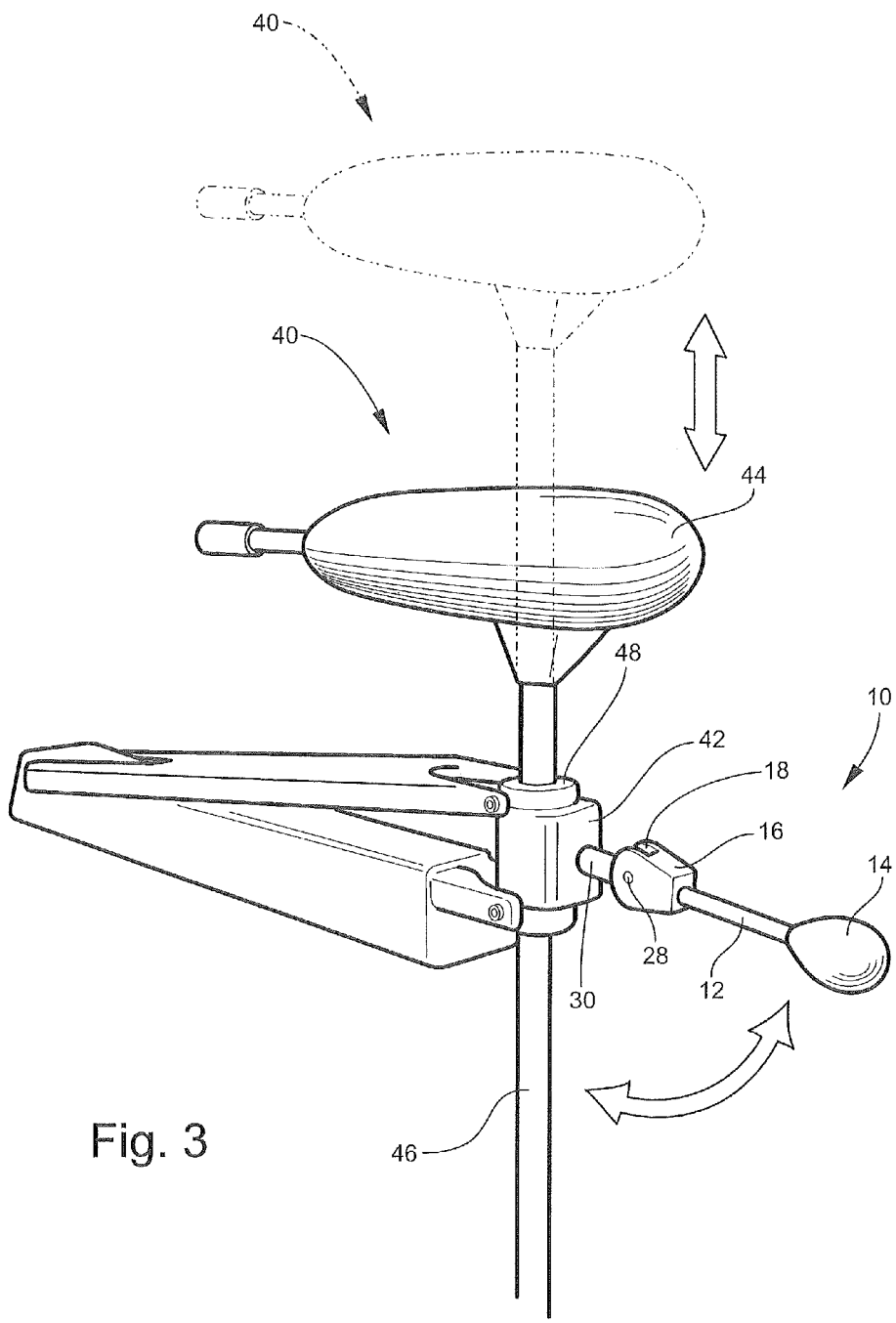
FIG. 3 is a perspective view of a trolling motor showing use of a cam lock according to one embodiment of the invention.

Referring now specifically to the drawings, a cam lock 10 according to one preferred embodiment of the invention is shown, and includes a threaded handle shaft 12 having a knob 14 threaded onto one end. The opposite threaded end is threaded into a cam body 16. The cam body 16 has a slot 18, and a perpendicular bore 20 is formed through the cam body 14 in a position to intersect the bore 20. A cam shaft 22 is provided, with a flat 24 formed on one end through which a bore 26 extends. When positioned in the slot 18, the flat 24 is fixed into a rotatable position by a dowel pin 28 that extends through the bore 20 in the cam body 16 and the bore 26 in the flat 24 of the cam shaft 22. The range of motion of the cam body 16 relative to the cam shaft 22 is preferably approximately a symmetrical 110 degrees. Both the cam body 16 and the dowel pin 28 are stainless steel, with the dowel pin being of a slightly softer grade to facilitate insertion and retention of the dowel pin 28 in the bore 20.

A shaft bushing 30, preferably fabricated from a high density polycarbonate material is positioned on the cam shaft 22, and the end of shaft bushing 30 proximate the cam body 16 forms a bearing surface against which the cam body 16 operates during its range of motion. The threaded end of the cam shaft 22 remote from the cam body 16 is threaded into a structure to be locked into position. As shown in FIGS. 3-5, a trolling motor 40 is shown, and the cam shaft 16 is threaded into a locking block 42 of the trolling motor 40. The motor 40 includes a motor housing 44 mounted for rotational movement on a propeller drive shaft 46 that transmits rotational movement to a propeller, not shown, mounted on a distal end of the propeller drive shaft 46. The propeller drive shaft 46 is mounted in the locking block 42.

The cam body 16 is lobe-shaped and is configured with dimensions whereby the width of the cam body 16 at its widest point is through the centerline of the bore 20, and a significantly shorter dimension from the centerline of the bore 20 to the forward end of the cam body 16. Thus, the rounded surface of the cam body 16 extending in the arc defined by the 110 degree range of motion of the cam shaft 22 defines a progression between a locking position and an unlocked position.

As is shown in FIG. 3, the knob 14 is used to raise the handle shaft 12 into the unlocked position. Note that the forward end of the cam body 16 resides against the proximate end of the shaft bushing 20, which releases pressure of the shaft bushing 20 against a collar 48 positioned for rotation within the locking block 42. In this position the motor 40 can be lowered, as also shown in FIG. 3. When in the desired position, the knob 14 is lowered, causing the cam body 16 to rotate, and the sides of cam body 16 having a greater dimension wedge against the proximate end of the shaft bushing 20, which in turn locks the propeller drive shaft 46 into its new position. As the downward movement of the handle shaft 12 continues, the cam lock 10 is placed into its fully locked position, as shown in FIG. 5.

In one preferred embodiment, the width of the cam body 16 at its widest point aligned with the centerline of the bore 20 is approximately 1.100 inches, or 0.550 inch from the centerline of the bore 20 to opposite sides of the cam body 16 at the widest point. The distance from the centerline of the bore 20 to the forward face of the cam body is approximately 0.400 inch. The difference between these two dimensions, 0.550 inch and 0.400 inch provide the dimensional variation necessary to create the camming action of the cam lock 10.

As noted above, this particular example is only illustrative of the uses of the cam lock 10. A cam lock according to the invention has been described with reference to a specific embodiment and example. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

I claim:

1. A cam lock, comprising:
    (a) a cam body having a lobe-shaped working periphery and rotatable between a first locking position and a second unlocked position;
    (b) a handle shaft mounted to the cam body for moving the cam body through a predetermined range of motion;
    (c) a cam shaft mounted to the cam body for pivotal movement relative to the cam body and having an end remote from the cam body for being fixed to a structure to be locked by a force applied against the structure; and
    (d) a bushing mounted on the cam shaft and having an end proximate the cam body against which a locking force is applied when the cam body is rotated into its locking position, wherein:
    the cam lock includes a slot formed in the cam body, a perpendicular bore formed through the cam body in a position to intersect the slot, the cam shaft positioned in the slot and fixed into a rotatable position by a dowel pin that extends through the bore in the cam body.

2. A cam lock according to claim 1, wherein the cam shaft has a range of motion of approximately 110 degrees relative to the cam body.

3. A cam lock for locking an elongate member in a predetermined desired position along a length of the elongate member, comprising:
    (a) a cam body having a lobe-shaped working periphery and rotatable between a first locking position and a second unlocked position;
    (b) a handle shaft mounted to the cam body for moving the cam body through a predetermined range of motion;
    (c) a cam shaft mounted to the cam body for pivotal movement relative to the cam body and having an end remote from the cam body operatively associated with a collar in which the elongate member is positioned for movement therein along the longitudinal axis of the elongate member;
    (d) a bushing mounted on the cam shaft and having an end proximate the cam body against which a locking force is applied when the cam body is rotated into its locking position; and
    (e) the bushing having an end distal from the cam body and adapted to exert a locking force against the collar when the cam body is in its locking position to fix the elongate member in the desired position, wherein:

the cam lock includes a slot formed in the cam body, a perpendicular bore formed through the cam body in a position to intersect the slot, a cam shaft positioned in the slot and fixed into a rotatable position by a dowel pin that extends through the bore in the cam body.

4. A cam lock according to claim 3, wherein the cam shaft has a range of motion of approximately 110 degrees relative to the cam body.

5. A trolling motor assembly, comprising:
(a) a motor positioned in a motor housing;
(b) a propeller drive shaft interconnecting the motor and a propeller;
(c) a locking block having a through bore within which the propeller drive shaft is mounted for vertical movement of the propeller to a predetermined desired water depth; and
(d) a cam lock for locking the propeller drive shaft in the predetermined desired position; and comprising:
  (I) a cam body having a lobe-shaped working periphery rotatable between a first locking position and a second unlocked position;
  (ii) a handle shaft mounted to the cam body for moving the cam body through a predetermined range of motion;
  (iii) a cam shaft mounted to the cam body for pivotal movement relative to the cam body and having an end remote from the cam body operatively associated with a collar in which the propeller drive shaft is positioned for movement therein along the longitudinal axis of the propeller drive shaft:
  (iv) a bushing mounted on the cam shaft and having an end proximate the cam body against which a locking force is applied when the cam body is rotated into its locking position; and
  (v) the bushing having an end distal from the cam body and adapted to exert a locking force against the collar when the cam body is in its locking position to fix the propeller drive shaft in the desired position.

6. A trolling motor assembly according to claim 5, wherein the cam shaft has a range of motion of approximately 110 degrees relative to the cam body.

7. A trolling motor assembly according to claim 6, and including a slot formed in the cam body, a perpendicular bore formed through the cam body in a position to intersect the slot, a cam shaft positioned in the slot and fixed into a rotatable position by a dowel pin that extends through the bore in the cam body.

8. A trolling motor assembly according to claim 7, wherein the bushing comprises a cylindrical body having a bore through which the cam shaft extends, and further wherein the bushing comprises a polycarbonate material.

9. A trolling motor assembly according to claim 7, wherein the cam shaft includes a flat positioned in the slot of the cam body for rotation therein.

10. A trolling motor assembly according to claim 5, wherein the handle shaft includes a knob on a distal end thereof.

* * * * *